(12) United States Patent
Matsunaga et al.

(10) Patent No.: US 11,383,706 B2
(45) Date of Patent: Jul. 12, 2022

(54) DRIVE ASSISTANCE SYSTEM AND VEHICLE WITH DRIVE ASSISTANCE SYSTEM

(71) Applicants: DENSO CORPORATION, Kariya (JP); TOYOTA JIDOSHA KABUSHIKI KAISHA, Toyota (JP)

(72) Inventors: Shogo Matsunaga, Kariya (JP); Takahiro Kuno, Susono (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 16/722,645

(22) Filed: Dec. 20, 2019

(65) Prior Publication Data

US 2020/0198628 A1 Jun. 25, 2020

(30) Foreign Application Priority Data

Dec. 25, 2018 (JP) .............................. JP2018-241489

(51) Int. Cl.
*B60W 30/09* (2012.01)
*G08G 1/16* (2006.01)

(52) U.S. Cl.
CPC .............. *B60W 30/09* (2013.01); *G08G 1/16* (2013.01); *B60W 2554/00* (2020.02); *B60W 2710/18* (2013.01); *B60W 2710/20* (2013.01)

(58) Field of Classification Search
CPC ............ B60W 30/09; B60W 2554/00; B60W 2710/18; B60W 2710/20; G08G 1/16; G08G 1/166
See application file for complete search history.

(56) References Cited

U.S. PATENT DOCUMENTS

| 9,701,307 B1* | 7/2017 | Newman ............. B60W 30/095 |
| 2004/0090117 A1 | 5/2004 | Dudeck et al. |
| 2004/0167702 A1 | 8/2004 | Isogai et al. |
| 2010/0042323 A1 | 2/2010 | Harada et al. |

(Continued)

FOREIGN PATENT DOCUMENTS

| JP | 2004-504216 A | 2/2004 |
| JP | 2004-255928 A | 9/2004 |

(Continued)

*Primary Examiner* — Jason Holloway
(74) *Attorney, Agent, or Firm* — Maschoff Brennan

(57) ABSTRACT

A drive assistance system includes a primary target setter to designate an object determined based on a current movement locus of the own vehicle to be a primary target probably interfering with the own vehicle; a prediction locus estimation unit to estimate a prediction locus along which the own vehicle moves when primary avoidance control is executed in the own vehicle to avoid the interference with the primary target; and a secondary target setter to designate another object determined based on the prediction locus as a secondary target probably interfering with the own vehicle. The drive assistance system also includes a drive assistance controller to execute drive assistance control in the own vehicle based on a determination of whether the interference by the secondary target can be avoided by executing a secondary avoidance control in the own vehicle to avoid the interference by the secondary target.

7 Claims, 9 Drawing Sheets

(56) References Cited

U.S. PATENT DOCUMENTS

| | | |
|---|---|---|
| 2016/0335892 A1 | 11/2016 | Okada et al. |
| 2016/0349364 A1* | 12/2016 | Hara .................... G01S 13/867 |
| 2017/0001637 A1* | 1/2017 | Nguyen Van ......... G01S 13/931 |
| 2017/0285647 A1 | 10/2017 | Saito et al. |
| 2019/0329762 A1* | 10/2019 | Kwon ................. B60T 8/17558 |
| 2021/0046924 A1* | 2/2021 | Caldwell ............ B60W 60/0011 |

FOREIGN PATENT DOCUMENTS

| | | |
|---|---|---|
| JP | 2008-213535 A | 9/2008 |
| JP | 2015-170233 A | 9/2015 |
| JP | 2016-167188 A | 9/2016 |
| JP | 2017-178166 A | 10/2017 |

\* cited by examiner

DRIVE ASSISTANCE SYSTEM AND VEHICLE WITH DRIVE ASSISTANCE SYSTEM

CROSS-REFERENCE TO RELATED APPLICATION

This patent application is based on and claims priority to Japanese Patent Application No. 2018-241489, filed on Dec. 25, 2018 in the Japan Patent Office, the entire disclosure of which is hereby incorporated by reference herein.

BACKGROUND

Technical Field

Embodiments of this disclosure relate to a drive assistance system and a vehicle with the drive assistance system that assists an own vehicle to drive based on a probability of interference by an object existing around the own vehicle.

Related Art

It is known that a drive assistance system executes collision avoidance control by either braking or steering an own vehicle when the drive assistance system determines that an object existing around the own vehicle can collide with the own vehicle.

However, when the collision avoidance control is performed in the own vehicle to avoid an object, a risk that another object will collide with the own vehicle increases. For example, when a pedestrian crossing an intersection is detected and the own vehicle is accordingly braked, a risk of collision with an oncoming vehicle passing the own vehicle at a location nearer than a position of the pedestrian increases.

SUMMARY

Accordingly, one aspect of the present disclosure provides a novel drive assistance system for controlling an own vehicle based on a probability that an object located around the own vehicle detected by an object detector interferes with running of the own vehicle. The drive assistance system includes a primary target setter to designate an object determined based on a current movement locus of the own vehicle to be a primary target probably interfering with the own vehicle and a prediction locus estimation unit to estimate a prediction locus along which the own vehicle moves when primary avoidance control is executed in the own vehicle. The primary avoidance control is executed for the own vehicle to avoid the interference with the primary target. The drive assistance system further includes a secondary target setter to designate another object determined based on the prediction locus as a secondary target probably interfering with the own vehicle and a drive assistance controller to execute drive assistance control in the own vehicle based on a determination of whether the interference by the secondary target can be avoided by executing a secondary avoidance control in the own vehicle. The secondary avoidance control is executed for the own vehicle to avoid the interference by the secondary target.

In another aspect of the present disclosure provides a novel vehicle driven by a driver. The vehicle includes the drive assistance system as described above.

Hence, according to the first aspect of the present disclosure, the assisting controller predicts a locus along which the own vehicle moves (i.e., runs) to avoid interference by a primary target when the primary target is designated and a primary avoidance control is executed in the own vehicle. Further, the assisting controller further executes drive assistance control to control the own vehicle based on a determination of whether an interference by a secondary object designated based on (or with reference to) the prediction locus can be avoided by the secondary avoidance control. Hence, since the secondary target can be designated based on the prediction locus and the drive assistance control is subsequently performed to control the own vehicle based on such a determination, the own vehicle can be appropriately assisted to drive without interfering with multiple objects existing around the own vehicle.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Japanese Patent Application Laid Open NO. 2008-213535 (JP-2008-213535-A) discusses that an intersection point at which an estimated movement locus of the own vehicle and that of the object intersect with each other is calculated, and time periods required for the own vehicle and the object to reach the intersection point are respectively calculated. Then, based on the calculated time periods, a probability of collision of the object with the own vehicle is determined and collision avoidance control is executed in accordance with a result of the determination. However, such a conventional technology raises the problem as described earlier. In view of this, it is an object of the present disclosure to address the above-described problem and provide a novel drive assistance system capable of appropriately assisting an own vehicle to drive when the own vehicle is probably interfered with by multiple objects existing around the own vehicle.

Figure 1:
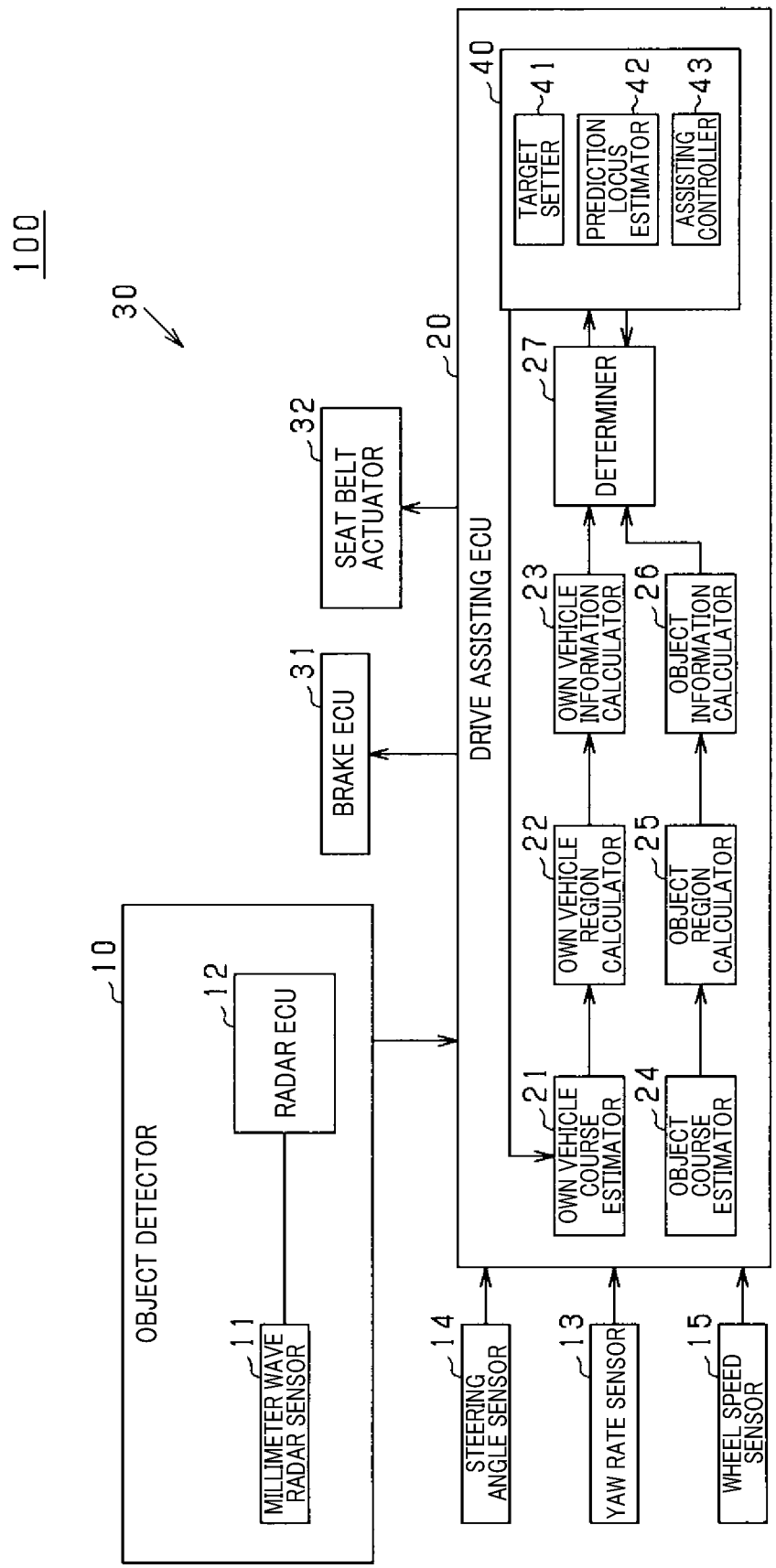
FIG. 1 is a diagram illustrating an exemplary configuration of a vehicle control system.

Referring now to the drawings, wherein like reference numerals designate identical or corresponding parts throughout the several views thereof, and to FIG. 1, a first embodiment of the present disclosure, in which an exemplary vehicle control system is applied to a vehicle, is herein below described. Specifically, a vehicle control system 100 shown in FIG. 1 includes an object detector 10 and a drive assisting ECU (Electric Control Unit) 20. In this embodiment, the drive assisting ECU 20 corresponds to a drive assistance system.

The object detector 10 transmits millimeter waves and detects objects existing around an own vehicle and obtains respective positions and velocities relative to the own vehicle. Specifically, the object detector 10 includes multiple millimeter wave radar sensors 11 and a radar ECU 12.

For example, the multiple millimeter wave radar sensors 11 are respectively attached to both front and rear sides of the own vehicle to emit millimeter waves and receive reflected waves from around the own vehicle. Each of the millimeter wave radar sensors 11 outputs a reflected wave signal generated based on the reflected wave as received to the radar ECU 12.

The radar ECU 12 calculates positions and relative velocities of the objects around the own vehicle based on the reflection wave signal output from the millimeter wave radar sensor 11. The radar ECU 12 then outputs calculation results of the positions and the relative velocities of the objects to the drive assisting ECU 20. Specifically, the radar ECU 12 may be configured by a computer composed of a CPU (Central Processing Unit), a ROM (Read Only Memory), and a RAM (Random Access Memory). The computer is further composed of an Input-Output interface.

The drive assisting ECU 20 is connected to a yaw rate sensor 13, a steering angle sensor 14, and a wheel speed sensor 15. The drive assisting ECU 20 is also connected to an interference suppression device 30. The yaw rate sensor 13 is provided in a central position of the own vehicle and outputs a yaw rate signal to the drive assisting ECU 20 in accordance with a speed of a change in steering amount of the own vehicle. The steering angle sensor 14 is attached to a steering rod of the vehicle and outputs a steering angle signal to the drive assisting ECU 20 in accordance with a change in steering angle of a steering wheel in response to operation of a driver. The wheel speed sensor 15 is attached to a wheel of the vehicle and outputs a wheel speed signal to the drive assisting ECU 20 in accordance with a wheel speed of the vehicle.

The interference suppression device 30 suppresses interference between an object and the own vehicle and acts as a device to reduce damage thereto. Hence, in this embodiment, the interference suppression device 30 includes a brake ECU 31 and a seat belt actuator 32.

The brake ECU 31 controls a braking force of a brake actuator based on a deceleration signal output from the drive assisting ECU 20. That is, by controlling the braking force of the brake actuator, an amount of deceleration of the own vehicle is adjusted. The seatbelt actuator 32 actuates a seat belt winding device to wind up and tension a seat belt based on an activation signal output from the drive assisting ECU 20.

The drive assisting ECU 20 determines if a probability of interference between an object and the own vehicle is present based on a position and a relative velocity of the object output from the object detector 10. For example, as shown, an object (e.g., a pedestrian) 51 is moving toward a right turn course along which the own vehicle 50 runs from a relatively further position from the own vehicle 50. At the same time, another object 52 (e.g., a vehicle) relatively closer to the own vehicle 50 is moving toward the right turn course of the own vehicle 50. Then, when the own vehicle 50 is about to turn right, the drive assisting ECU 20 determines if a probability that the own vehicle 50 will be interfered with in running exists based on a movement course of the own vehicle 50 and movement courses of objects 51 and 52 around the own vehicle 50.

In the specification, a probability that an object will collide with the own vehicle 50 or it does not collide but comes close to the own vehicle 50 thereby interfering in running of the own vehicle 50 is herein below referred to as an interfering probability. That is, the interfering probability may be either a collision probability that an object and the own vehicle 50 collide with each other or an approach probability that the object approaches the own vehicle 50 within a prescribed distant threshold L1.

The drive assisting ECU 20 may be configured by a computer composed of a CPU, a ROM, and a RAM. The computer is composed of an input and output interface. The drive assisting ECU 20 performs collision suppressing control in the own vehicle 50 by activating the interference suppression device 30 to operate when it determines that an object existing around the own vehicle 50 interferes with traveling of the own vehicle 50. Accordingly, the drive assisting ECU 20 performs the collision suppressing control by generating and outputting a deceleration signal to the brake ECU 31 and a starting signal to the seat belt actuator 32.

Here, the drive assisting ECU 20 includes an own vehicle course estimator 21, an own vehicle region calculator 22 and an own vehicle information calculator 23. The drive assisting ECU 20 also includes an object course estimator 24, an object region calculator 25 and an object information calculator 26. The drive assisting ECU 20 further includes a determiner 27 and a drive assisting unit 40. Specifically, the vehicle course estimator 21, the vehicle region calculator 22 and the vehicle information calculator 23 cooperatively estimates a movement course of the own vehicle 50. Further, the object course estimator 24, the object region calculator 25 and the object information calculator 26 cooperatively estimates a movement course of an object or objects around the own vehicle 50. The determiner 27 determines if an interfering probability that the own vehicle 50 is interfered in running exists based on the estimated movement courses of the own vehicle 50 and the object, respectively. Further, the object course estimator 24, the object region calculator 25 and the object information calculator 26 cooperatively estimates a movement course of an object around the own vehicle 50. The determiner 27 determines based on the estimated movement courses of the own vehicle 50 and the object, respectively, if an interfering probability that the object interferes with running of the own vehicle 50 exists.

However, a method of estimating the movement course is not particularly limited and a conventional movement course estimating method can be used. In this embodiment, one example of determining a collision probability that an own vehicle 50 will collide with an object is herein below described based on a method of calculating solid bodies respectively indicating transitions of presence regions of the own vehicle 50 and the object virtually formed in a three-dimensional coordinate system.

In this method, the drive assisting ECU 20 determines if a collision probability that the own vehicle 50 and the object will collide with each other is present based on a presence or absence of an intersection of the own vehicle 50 and the object 33 in the three-dimensional coordinate system.

Hence, with this method, a collision probability can be determined in various situations including a positional relation between the object and the own vehicle 50 and a moving condition of the object. For example, when the own vehicle 50 and the object are moving in parallel or the object is stationary, a determination of the collision of the object with the own vehicle 50 can be performed.

Specifically, the own vehicle course estimator 21 calculates an own vehicle estimated course PA1 indicating an estimated course in which the own vehicle 50 runs, based on a speed of change in steering amount of the own vehicle 50 and a speed of the own vehicle. Specifically, in this embodiment, the vehicle course estimator 21 calculates an estimated curve radius of the own vehicle 50 based on a yaw rate $\Psi$ of the own vehicle 50 calculated based on a yaw rate signal transmitted from the yaw rate sensor 13 and an own vehicle speed calculated based on a wheel speed signal transmitted from the wheel speed sensor 15. The vehicle course estimator 21 then calculates a course as a vehicle estimated course PA1 along which the own vehicle 50 travels in accordance with the estimated curve radius calculated in this way. Here, the speed of change in steering amount of the own vehicle 50 can be calculated based on the steering angle signal transmitted from the steering angle sensor 14.

Further, the own vehicle region calculator 22 calculates an own vehicle presence region EA1 where the own vehicle 50 is present, at prescribed regular intervals along the vehicle estimated course PA1 on an XY plane of a two-dimensional coordinate system defined by both a distance Y in an own vehicle traveling direction and a lateral position X as a distance in a widthwise direction of the own vehicle. More specifically, according to this embodiment, the own vehicle region calculator 22 calculates the own vehicle presence regions EA1 at every position on the vehicle estimated course PA1 during a period from a current time T0 to an estimation ending time TN.

Figure 3A:
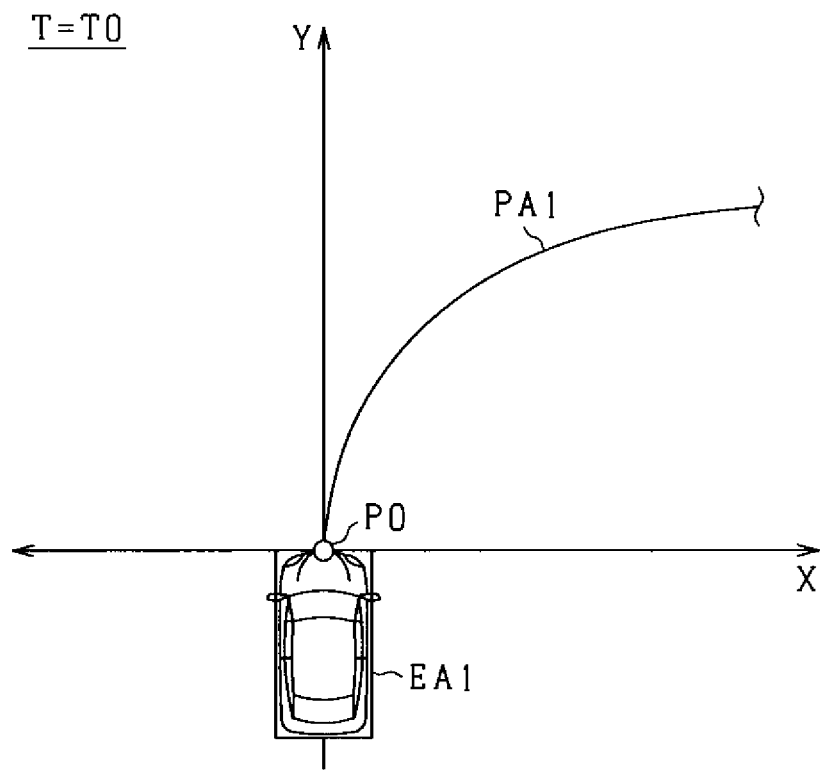
FIGS. 3A and 3B are diagrams collectively illustrating a region on a XY plane in which the own vehicle is present.

FIG. 3A illustrates the own vehicle presence region EA1 at the current time T0. In this embodiment, the own vehicle presence region EA1 is defined as a rectangular region completely including an outer periphery of the own vehicle 50 when viewed from above the own vehicle 50. Specifically, the own vehicle region calculator 22 determines the rectangular region of the own vehicle presence region EA1 based on vehicle specifications indicating various sizes of the own vehicle 50. For example, the own vehicle presence region EA1 at the current time T0 is defined to render a reference position P0 of the own vehicle 50 to coincide with an intersection (0, 0) of coordinate axes X and Y. Here, the reference position P0 of the own vehicle 50 is located at a widthwise center in front of the own vehicle 50.

Figure 3B:
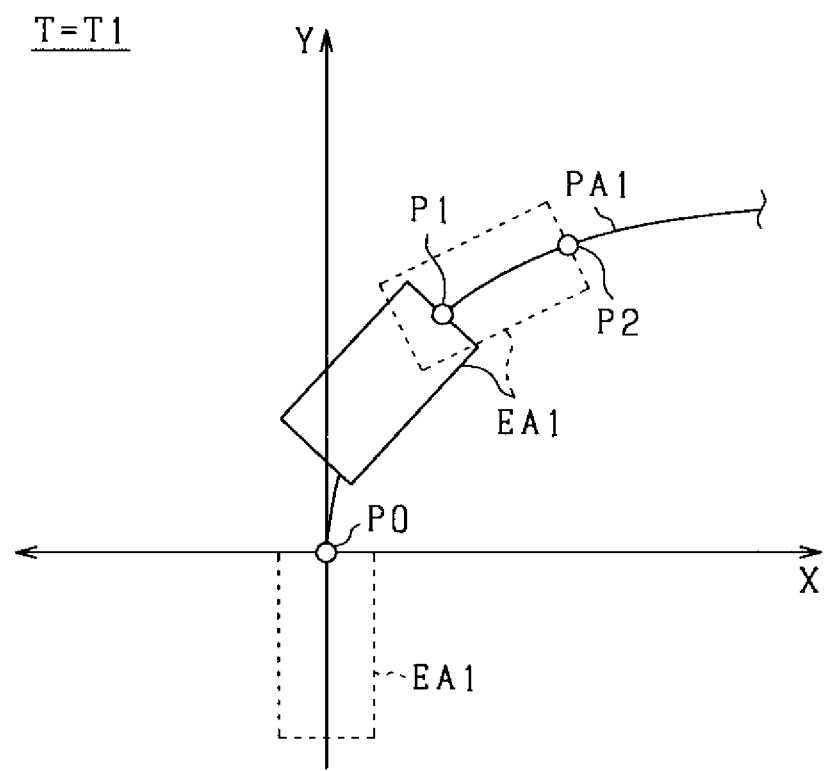

FIG. 3B illustrates a future own vehicle presence region EA1 existing when a time T1 has elapsed after the current time T0. In FIG. 3B, to facilitate explanation, the own vehicle presence region EA1 at the current time T0 and the future own vehicle presence region EA1 existing when a time T2 has elapsed after the current time T0 (T2>T1) are shown by solid and broken lines, respectively.

The future vehicle presence region EA1 existing when the time T1 has elapsed after the current time T0 indicates a presence region of the own vehicle 50 moving along the own vehicle estimated course PA1 when the time T1 has elapsed after leaving the current position of the own vehicle 50. For example, the own vehicle region calculator 22 calculates a future transit position in the own vehicle estimated course PA1 when a given time Tn (n is from 0 or more to N or less) has elapsed after the own vehicle 50 leaves the reference position P0 at the current time T0 based on the own vehicle estimated course PA1 calculated at a current position and a speed of the own vehicle. Then, the own vehicle region calculator 22 calculates a rectangular region having a reference position Pn coinciding with the passing position as a future own vehicle presence region EA1 when the time Tn has elapsed after the current time T0. Here, in this embodiment, an orientation of the own vehicle presence region EA1 calculated at each of the elapsed times Tn corresponds to a tangent of the own vehicle estimated course PA1 at each of the reference positions Pn.

Further, the own vehicle information calculator 23 calculates an own vehicle solid body D51 indicating a transition of the own vehicle presence region EA1 by complementing multiple vehicle presence regions EA1 in a three-dimensional coordinate system defined by a distance Y in a traveling direction of the own vehicle 50, a lateral position X of the own vehicle 50 in a widthwise direction and an elapsed time T from a current time T0. A specific example of an own vehicle solid body D50 is shown in each of FIGS. 5A to 6B. In the three-dimensional coordinate system of each of FIGS. 5A to 6B, a point (0, 0, 0) describes the current reference position P0 of the own vehicle 50. The own vehicle solid body D50 describes the transition of movement of the own vehicle presence region EA1 in the three-dimensional coordinate system as the time T elapses. Specifically, in FIGS. 5A to 6B, the own vehicle solid body D51 is calculated during a prediction time period starting from the current time T0 ending at the estimation ending time TN.

More specifically, according to this embodiment, the own vehicle information calculator 23 converts calculated multiple own vehicle presence regions EA1 into information specified in the three-dimensional coordinate system. Then, the own vehicle information calculator 23 calculates an own vehicle solid body D51 by applying linear interpolation between adjacent two sets of four corners of own vehicle presence regions EA1 in a direction of a T axis defining an elapse of time in the three-dimensional coordinate system.

Further, the object course estimator 24 calculates an object estimated course PA2 indicating an estimated course of the object based on a position of an object detected by the object detector 10 and a relative velocity of the object relative to the own vehicle 50. More specifically, the object course estimator 24 calculates a movement locus of the object as an object estimated course PA2 based on a change in object position detected by the object detector 10.

Figure 4A:
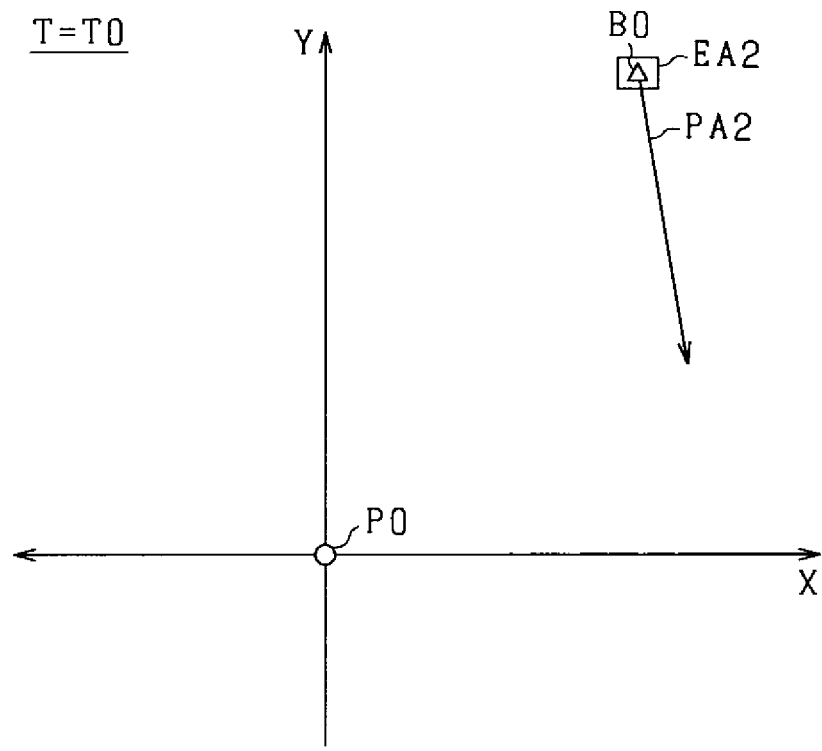
FIGS. 4A and 4B are diagrams collectively illustrating a region on a XY plane in which the object is present.

Further, the object region calculator 25 calculates an object presence region EA2 on the XY plane, in which an object is present, at prescribed regular intervals on the object estimated course PA2. That is, the object presence region EA2 describes a presence region of the object at prescribed regular intervals when the object moves along the object estimated course PA2. FIG. 4A illustrates an object presence region EA2 at the current time T0. The object presence region EA2 on the XY plane at the current time T0 describes a presence region of the object detected at the current position of the own vehicle 50 by the object detector 10. The object region calculator 25 calculates the object presence region EA2 as a rectangular region completely including an outer periphery of the object when viewed from above the object. The rectangular region of the object presence region EA2 is calculated based on a size of the object calculated by the object detector 10.

Figure 4B:
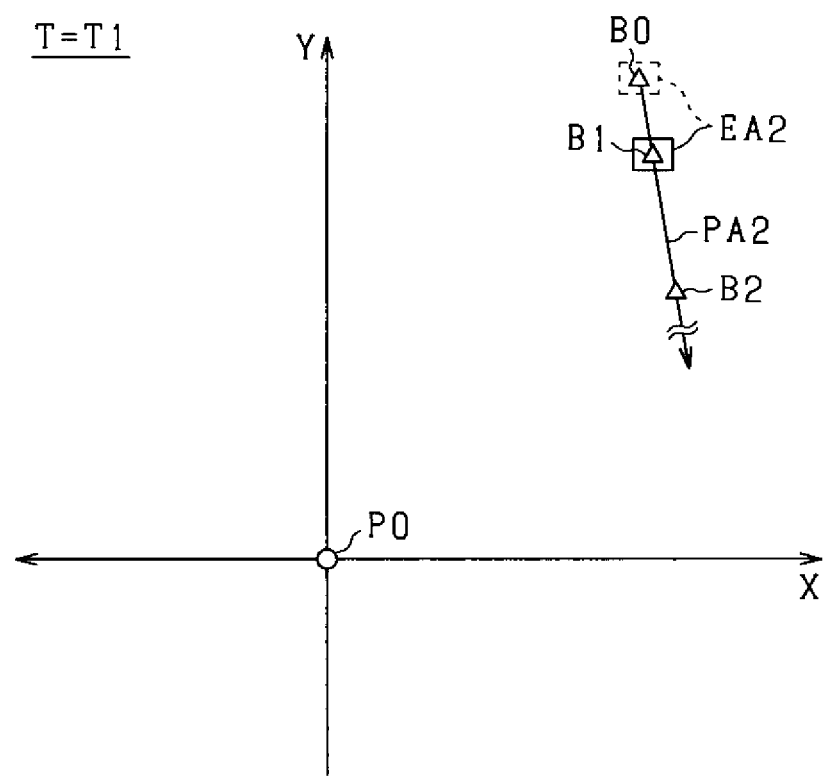

FIG. 4B illustrates a future object presence region EA2 existing when a time T1 has elapsed after the current time T0. Specifically, the object region calculator 25 may calculate a passing position passed by the object on the object estimated course PA2 when a prescribed time Tn has elapsed after the object leaves the current reference position B0 thereof based on the object estimated course PA2 and a relative velocity of the object relative to the own vehicle 50. Then, the object region calculator 25 calculates a rectangular region having a reference position Bn coinciding with each of the passing positions as a future object presence region EA2 existing when the time Tn has elapsed after the current time T0.

Further, the object information calculator 26 calculates an object solid body D52 indicating a transition of the object presence regions EA2 by applying linear interpolation between adjacent two object presence regions EA2 in a three-dimensional coordinate system. Each of object solid bodies D51 and D52 shown in FIGS. 5A to 6B is an example of the object solid body D52 and describes a movement transition of the object presence region EA2 in the three-dimensional coordinate system as time T elapses. More specifically, according to this embodiment, the object information calculator 26 calculates the region occupied by the object solid body D52 by applying linear interpolation between adjacent two sets of four corners of object presence regions EA2 in a direction of the T-axis specifying an elapse of time. Hence, the object solid body D52 corresponds to the movement course of the object. Further, the object region calculator 25 and the object information calculator 26 collectively correspond to the movement course calculator.

Further, the determiner 27 determines if the object probably will collide with the own vehicle 50 based on presence or absence of an intersection of the own vehicle solid body D51 and the object solid body D52. Specifically, in this embodiment, the determiner 27 calculates a first determination region DA51 indicating a presence region of the own vehicle 50 when a prescribed time T has elapsed based on the vehicle solid body D51. The determiner 27 also calculates a second determination region DA52 indicating a presence region of the object when the time T has elapsed, i.e., at the same time when the first determination region DA51 is calculated. Then, when the same time T has elapsed and the first determination region DA51 and the second determination region DA52 calculated in this way overlap each other, the determiner 27 determines that the vehicle solid body D51 and the object solid body D52 intersect each other.

Figure 5A:
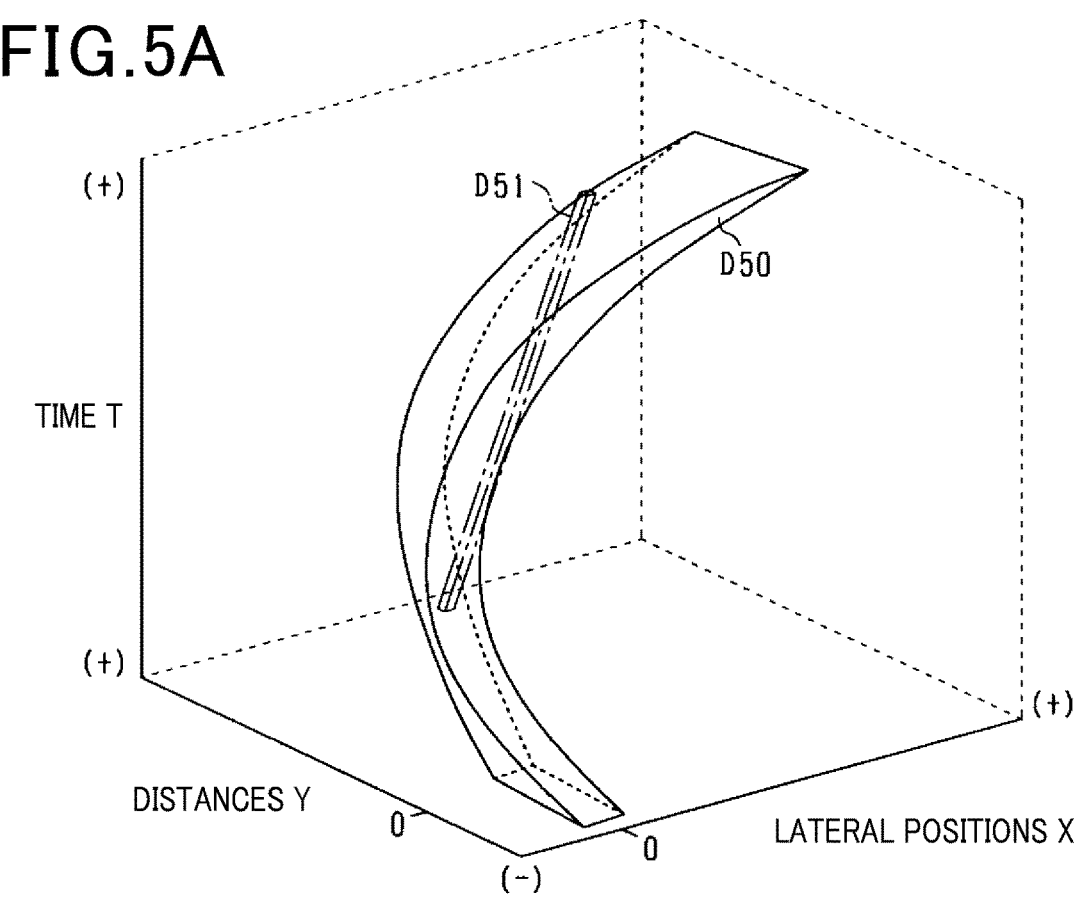
FIGS. 5A and 5B are diagrams collectively illustrating an own vehicle solid body and an object solid body (i.e., a primary target)
Figure 5B:
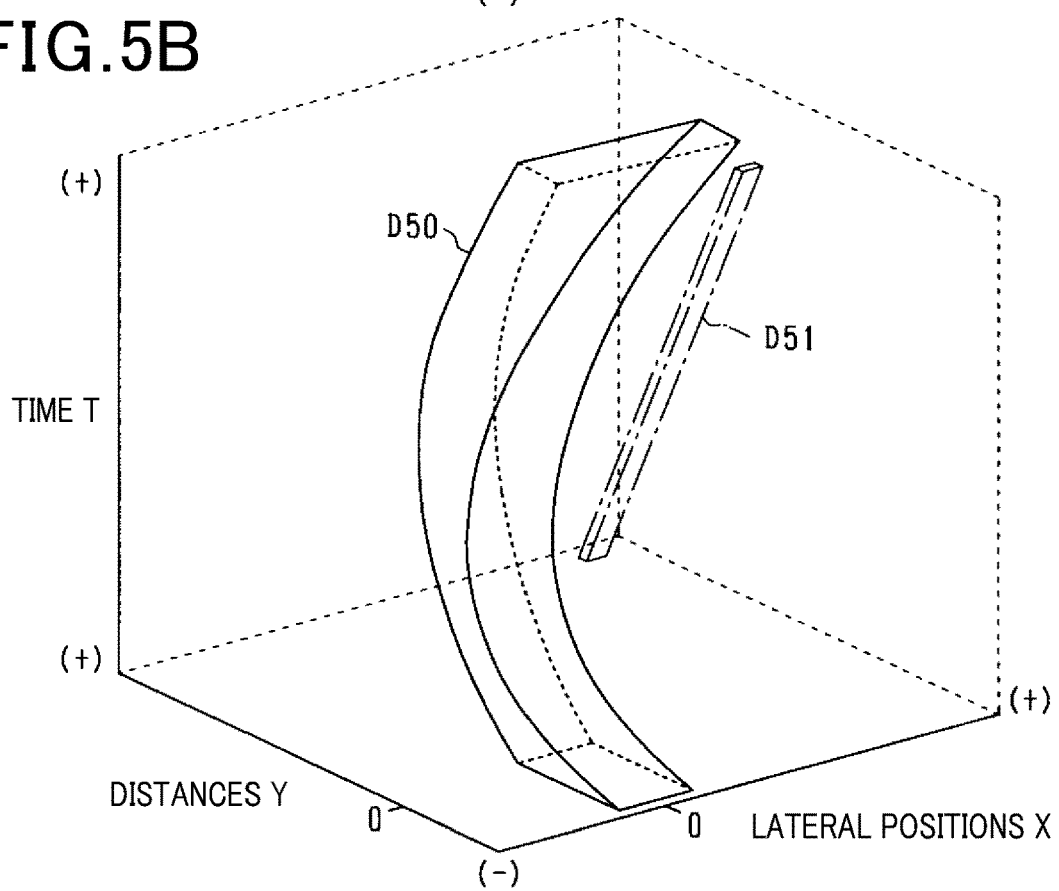
Figure 7A:
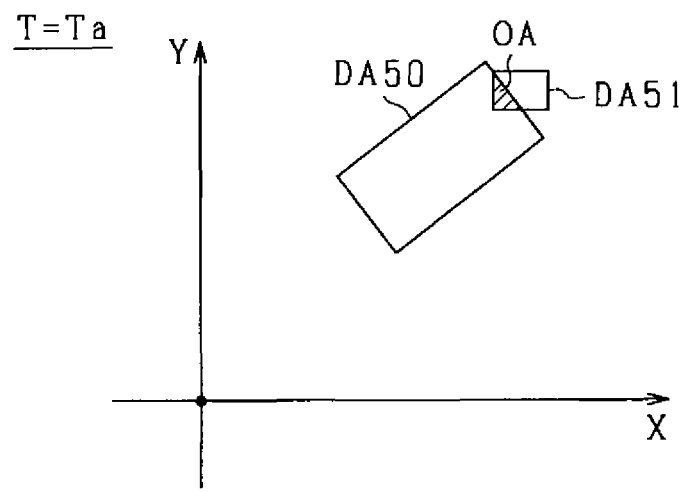
FIGS. 7A and 7B are diagrams collectively illustrating a method of determining if the object will collide with the own vehicle by using the vehicle solid body and the object solid body.
Figure 7B:
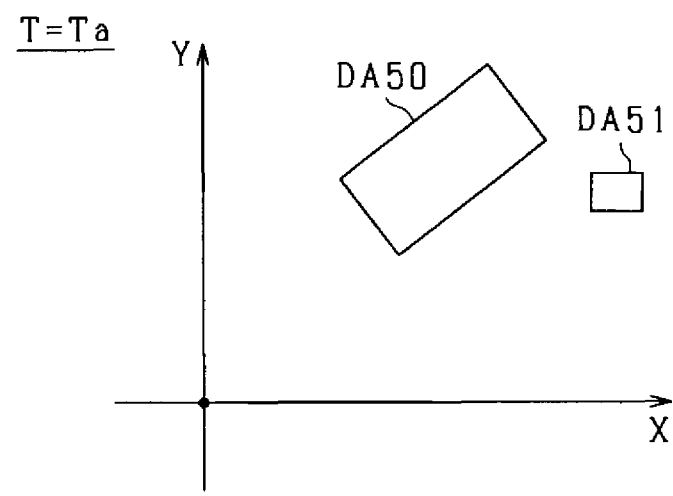

Herein below, a system of determining possible collision between the own vehicle 50 and the object 51 based on the vehicle solid body D50 and the object solid body D51 shown in FIGS. 5A and 5B is more specifically described with reference to FIGS. 7A and 7B. That is, FIGS. 7A and 7B are diagrams collectively illustrating a first determination region DA50 calculated based on the own vehicle solid body D50 and a second determination region DA52 calculated based on an object solid body D51 on the XY plane when a time Ta has elapsed. When the own vehicle solid body D50 and the object solid body D51 intersect, a region OA overlapping with both the first determination region DA50 and the second determination region DA51 is present on the XY plane when the same time Ta has elapsed as shown in FIG. 7A. Therefore, the determiner 27 determines that the own vehicle 50 and the object 51 collide with each other since the region OA overlaps with both the first determination region DA50 and the second determination region DA51 when the same time T has elapsed.

On the other hand, when the own vehicle solid body D50 and the object solid body D51 do not intersect with each other, an overlap region OA overlapping with both the first determination region DA50 and the second determination region DA51 is absent on the XY plane for all of the elapsed time T including the elapsed time Ta as shown in FIG. 7B. Therefore, because a region OA overlapping with both the first determination region DA50 and the second determination region DA51 is absent when the same time T has elapsed, the determiner 27 determines that the own vehicle 50 and the object 51 do not collide with each other.

In this embodiment, the determiner 27 calculates the first determination region DA50 and the second determination region DA51 at the same time T at prescribed regular intervals ΔT (delta T) between the current time T0 and the estimation ending time TN. Then, based on the first determination region DA50 and the second determination region DA51 calculated at the same elapsed time T, the determiner 27 determines if the overlapping region OA is present. Further, a determination of collision between the own vehicle 50 and the object 52 can be similarly performed by using the vehicle solid body D50 and the object solid body D52 shown in FIG. 6 in substantially the same manner as described above.

In FIG. 5A, since the overlapping region is present in each of the vehicle solid body D50 and the object solid body D51, it is determined that there can be a collision therebetween. By contrast, in FIG. 5B, since the overlapping region is absent in each of the vehicle solid body D50 and the object solid body D51, it is determined that there may be no collision therebetween. Further, in FIG. 6A, since the overlapping region is absent in each of the vehicle solid body D50 and the object solid body D52, it is determined that there may be no collision therebetween. By contrast, in FIG. 6B, since the overlapping region is present in each of the vehicle solid body D50 and the object solid body D52, it is determined that there can be a collision therebetween.

Further, the drive assisting unit 40 includes a target setter 41, a prediction locus estimator 42 and an assisting controller 43. The target setter 41 designates a primary target and a secondary target based on a determination result of an interfering probability generated by the determiner 27. Specifically, among object around the own vehicle 50, one of the objects is designated as the primary target when it is determined that the object probably interferes with the own vehicle 50. Further, an object is designated as the secondary target when it is determined based on a primary prediction locus described later in detail that the object probably interferes with the own vehicle 50.

Further, the prediction locus estimator 42 estimates a course as a primary prediction locus through which the own vehicle 50 moves when primary avoidance control is performed to control the own vehicle 50 to avoid the interference by the object designated as the primary target. Here, the prediction locus estimator 42 can further estimates a course as a secondary prediction locus through which the own vehicle 50 moves when secondary avoidance control is performed to control the own vehicle 50 to avoid an interference by an object designated as the secondary target.

The prediction locus estimator 42 may otherwise estimate a rate of a change in steering amount and a vehicle speed of the own vehicle 50 when the primary avoidance control is executed, and output such an estimation result to the own vehicle course estimator 21. The vehicle course estimator 21 may then calculate an own vehicle estimated course PA1 in a primary prediction locus based on the speed of the change in steering amount and the vehicle speed of the own vehicle 50 as estimated by the prediction locus estimation unit 42 as a result of the primary avoidance control. Further, the own vehicle region calculator 22 may calculate own vehicle presence regions EA1 in which the own vehicle 50 is present, at prescribed regular intervals on the own vehicle estimated course PA1 in the primary prediction locus. Further, the own vehicle information calculator 23 may calculate a vehicle solid body D51 indicating a transition of the own vehicle presence region EA1 on a three-dimensional coordinate system based on the primary prediction locus.

Further, the determiner 27 determines whether an object around the own vehicle 50 can interfere in running of the own vehicle 50 based on own vehicle information obtained based on the primary prediction locus and object information. Further, based on the above-described determination result, the target setter 41 designates an object 52 as a secondary target, because it interferes with running of the own vehicle 50 under the primary avoidance control. Here, a type of the object designated as each of the primary target and the secondary target is not particularly limited, and includes a vehicle, a bicycle and a motorcycle. The type further includes a pedestrian, an animal and a structure or the like. The type may be either a moving body or a stationary body as well.

Figure 2:
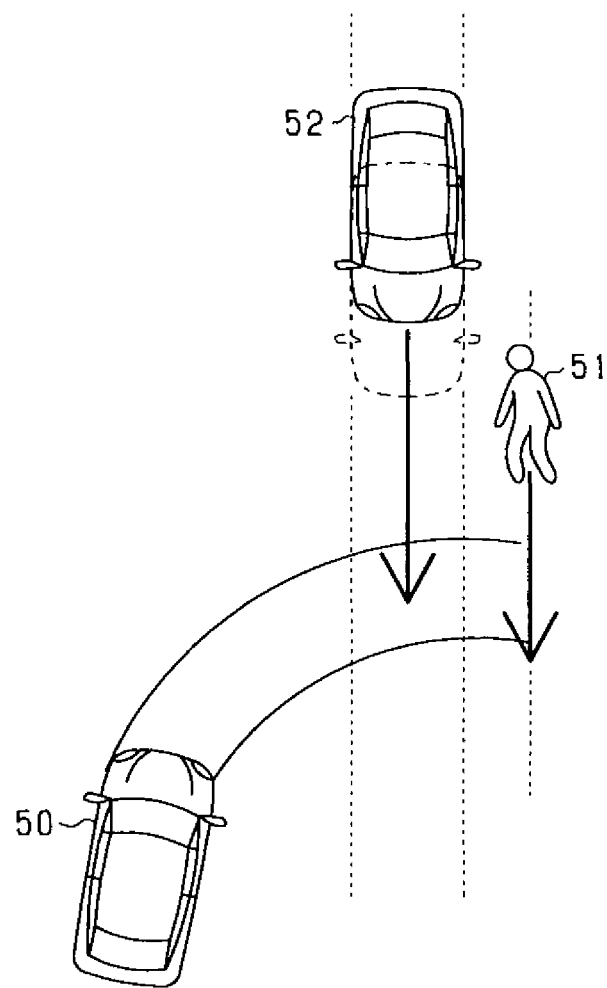
FIG. 2 is a diagram illustrating an own vehicle, a primary target and a secondary target.
Figure 6A:
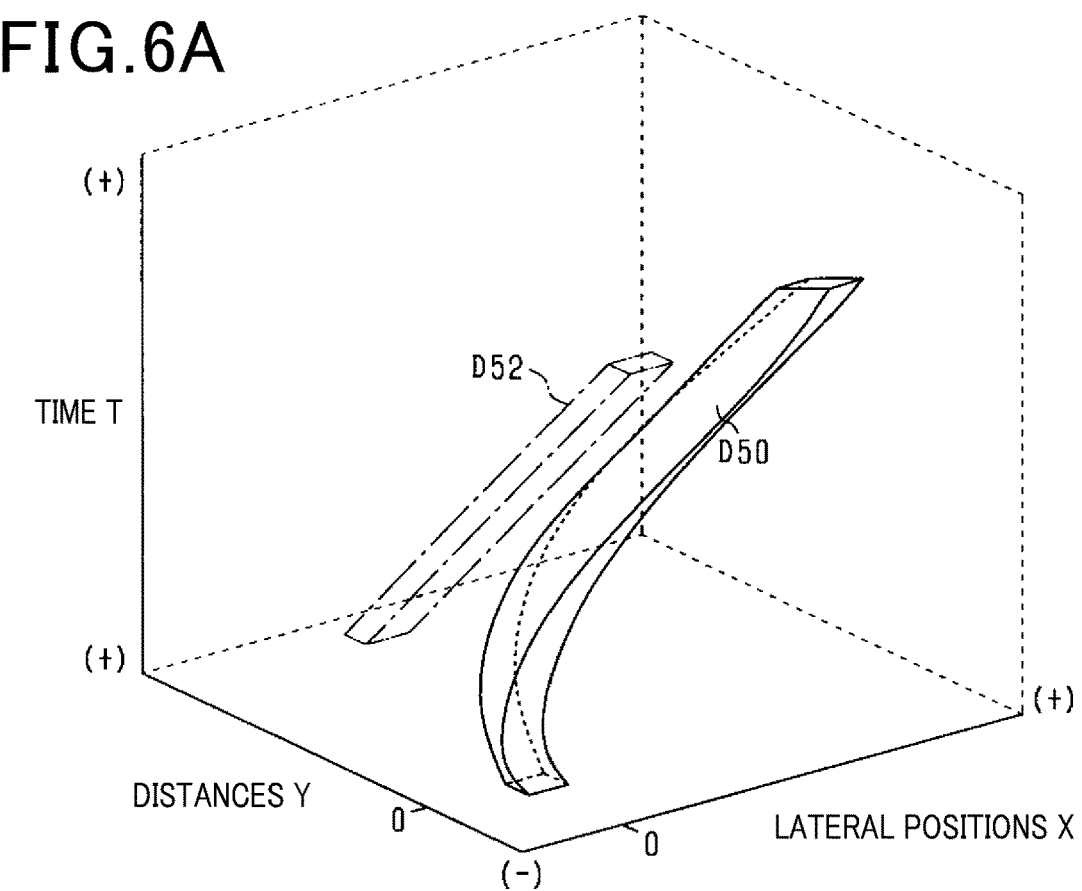
FIGS. 6A and 6B are diagrams collectively illustrating an own vehicle solid body and an object solid body (i.e., a secondary target)
Figure 6B:
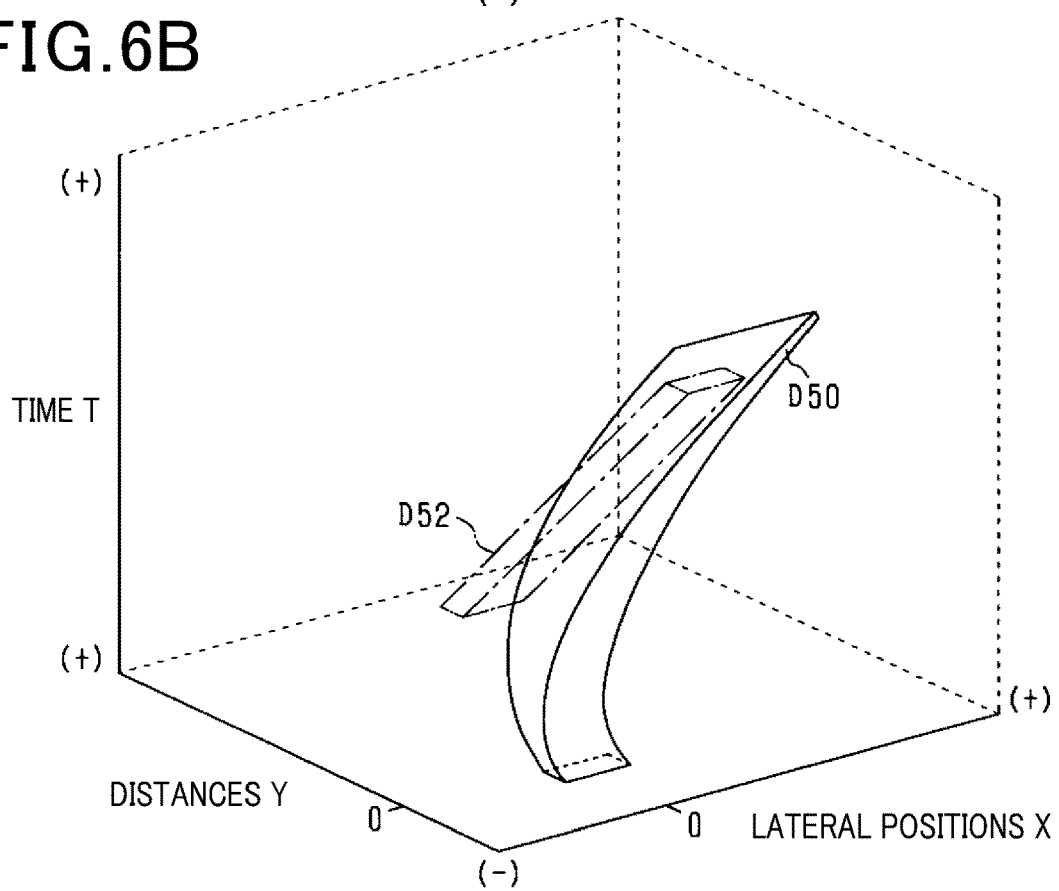

Further, the own vehicle solid body D50 shown in each of FIGS. 5A and 6A is calculated based on a current state of the own vehicle 50. By contrast, the own vehicle solid body D50 shown in each of FIGS. 5B and 6B is calculated based on the primary prediction locus of the own vehicle 50. As described earlier, the primary prediction locus of the own vehicle 50 corresponds to a movement course of the own vehicle 50 when the primary avoidance control is executed. FIG. 6B illustrates a situation where a collision with the object 52 is likely to occur as a result of controlling the own vehicle 50 to avoid collision with the object 51. That is, since the own vehicle solid body D50 changes its shape from that shown in FIG. 5A to that shown in FIG. 5B when the primary control is executed in the own vehicle 50, the collision with the object 51 designated as the primary target can be to avoided on one hand. On the other hand, as shown in FIG. 6A, an object 52 previously determined to be unlikely to collide with the own vehicle 50 and not to be a target for the primary control can be determined sometimes to be likely to collide therewith as a result of the primary control as shown in FIG. 6B. For example, as shown in FIG. 2, when the object 51 of the pedestrian is designated as the primary target and automatic braking is performed as primary avoidance control in the own vehicle 50 thereby stopping the own vehicle 50 on a movement course of the object 52 moving closer to the own vehicle 50 than the object 51, a situation shown in FIG. 6B can occur.

Further, the assisting controller 43 determines based on the primary prediction locus if interference probably caused by the secondary target (e.g., the object 52) can be avoided by executing secondary avoidance control in the own vehicle 50. Then, the assisting controller 43 executes drive assistance control in the own vehicle 50 based on a result of such a determination. Here, the determiner 27 can otherwise execute such a determination, i.e., whether the interference probably caused by the secondary target can be avoided by executing the secondary avoidance control in the own vehicle 50, based on a secondary prediction locus.

Hence, the assisting controller 43 may perform the secondary avoidance control when the interference caused by the secondary target is determined to be avoidable by executing the secondary avoidance control. For example, as shown in FIG. 2, in a situation where the object 51 as a primary target is moving at a further position from the own vehicle 50 while the object 52 as a secondary target is moving at a closer position, collisions of both the objects 51 and 52 with the own vehicle 50 can be avoided by executing the secondary avoidance control in which the own vehicle 50 is stopped before the movement course of the object 52 closer to a current position of the own vehicle 50.

Further, when it is determined that the interference probably caused by the secondary target cannot be avoided by executing the secondary avoidance control, the assisting controller 43 can estimate the damage probably caused by the secondary avoidance control of the own vehicle 50. Further, in such a situation, the assisting controller 43 can perform prescribed control capable of minimizing the damage estimated in this way. Further, when the interference with the secondary target is unavoidable, interference with only one of the primary target and the secondary target can be avoided sometimes. In such a situation, driving operation capable of minimizing damage is appropriately performed in accordance with the estimated damage.

Further, both human injury and a physical damage can be estimated by calculating an energy generated by collision based on a type, a size and a weight, etc., of each of the own vehicle 50, the object, such as the primary target, the secondary target, and other objects around the own vehicle 50 (i.e., an object not designated as the primary target or the secondary target). Furthermore, the assisting controller 43 may be preferably configured to reduce the human injury in preference to the physical damage. That is, in the estimation of the damage, it is preferable that the human injury is assumed to be the largest damage.

Further, when possible interference caused by the secondary target is determined to be unavoidable by executing the secondary avoidance control, the assisting controller 43 may not perform driving assistance related to automatic control for a vehicle such as braking, steering, etc., but is configured to notify the own vehicle 50 of the situation that the own vehicle 50 can be interfered with. That is, by operation of a driver of the own vehicle 50, an opportunity for either avoidance of the interference or reduction of the damage due to the interference can be used.

Figure 8:
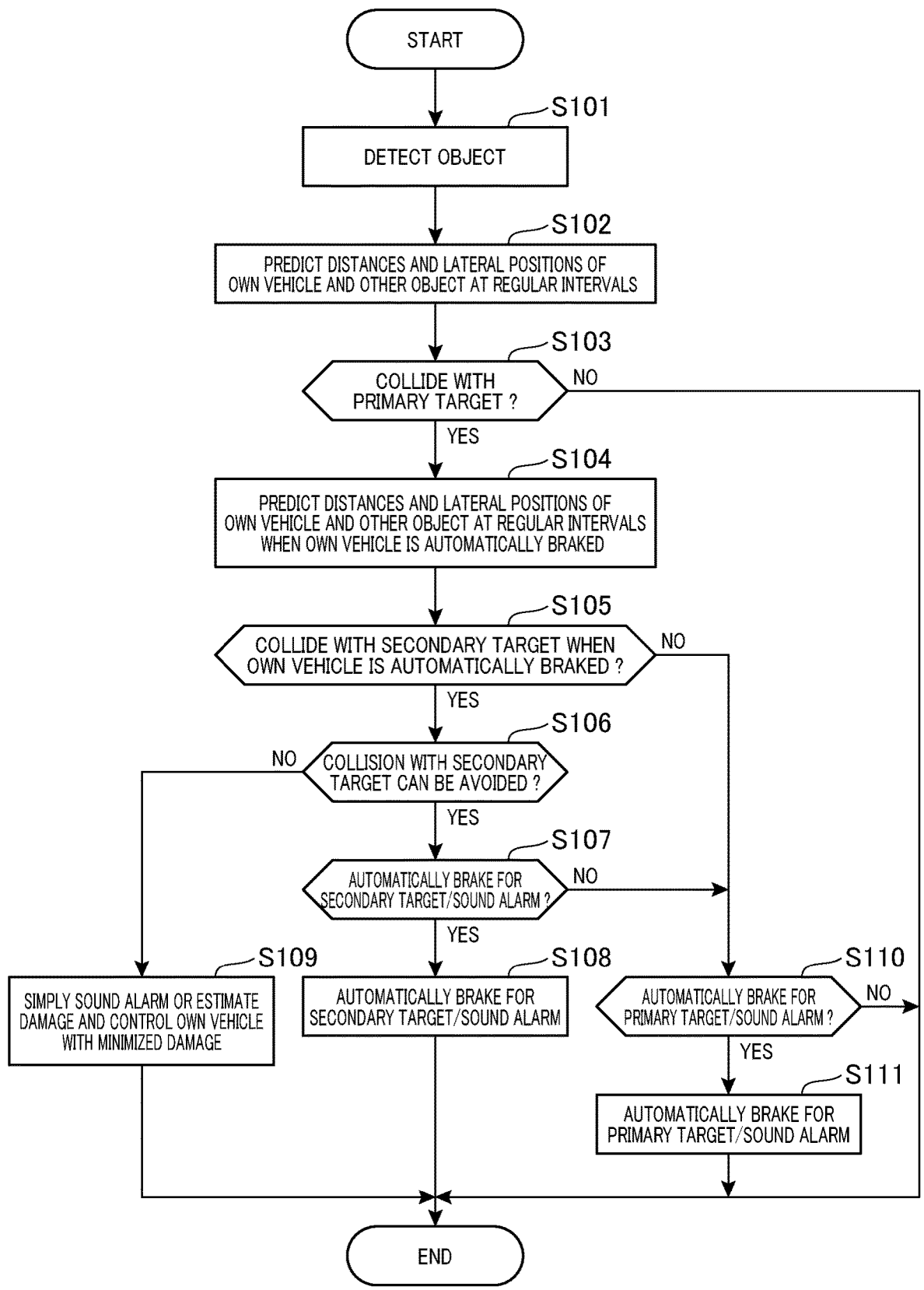
FIG. 8 is a flowchart illustrating an exemplary drive assistance control system of avoiding collision according to a first embodiment of the present disclosure.

FIG. 8 illustrates a flowchart illustrating an exemplary drive assisting process executed by the drive assisting ECU 20. This drive assisting process is repeatedly executed in a prescribed cycle during running of the own vehicle 50.

In step S101, a position of an object around the own vehicle and a relative velocity of the object relative to the own vehicle calculated by the radar ECU 12 based on a reflection wave signal output from the millimeter wave radar sensor 11 are acquired, thereby detecting the object around the own vehicle 50. Then, the process proceeds to step S102.

In step S102, a distance of each of the own vehicle 50 and the other object (i.e., the object detected in step S101) and a lateral position of each of the own vehicle 50 and the other object are predicted at prescribed regular intervals from current time. Specifically, an own vehicle estimated course PA1 is calculated at a current position of the own vehicle 50 on an XY plane based on a velocity of the own vehicle 50 calculated based on a wheel speed signal and a yaw rate $\Psi$ P of the own vehicle 50 calculated based on a yaw rate signal. Then, multiple own vehicle presence regions EA1 on the vehicle estimated course PA1 are calculated and are then complemented in a three-dimensional coordinate system, thereby calculating an extent of an own vehicle solid body D51. Then, based on a current state of the own vehicle 50, information of the own vehicle 50 is calculated.

Similarly, an object estimated course PA2 of the other object existing around the own vehicle 50 is calculated on the XY plane based on a position of the object and a relative velocity thereof relative to the own vehicle 50 as detected by the object detector 10. Then, multiple object presence regions EA2 passing through the object estimated course PA2 are calculated and are complemented in the three-dimensional coordinate system, thereby calculating the object solid body D52.

In step S103, it is determined if the own vehicle 50 will collide with a primary target. Specifically, based on a current traveling locus of the own vehicle 50, it is determined if the own vehicle 50 can collide with another object. Then, if the determination is positive (i.e., a positive determination is made), the object is designated as the primary target. Then, the process proceeds to step S104.

More specifically, in step S103, it is determined if an intersection of the own vehicle solid body D51 and the object solid body D52 calculated in step S102 is present. For example, as shown in FIG. 7A, when the region OA overlapping both the first determination region DA51 and the second determination region DA52 is present at the same elapsed time T, it is determined that there is an intersection of the vehicle solid body D51 and the object solid body D52 and accordingly the own vehicle 50 and the object will collide with each other. More specifically, if it is determined in step S103 that an intersection of the vehicle solid body D51 and the object solid body D52 is present (i.e., the determination is positive), the object (e.g., the object 51) is designated as the primary target, and accordingly the process proceeds to the step S104. By contrast, if it is determined in the step that there is no intersection of the vehicle solid body D51 and the object solid body D52, the process is terminated.

In step S104, a distance Y of each of the own vehicle and other object and a lateral position X of the own vehicle and the other object are predicted at prescribed regular intervals T when the primary control (e.g., automatic braking in this embodiment) is executed to avoid interference by the primary target. That is, the primary prediction locus is estimated. Further, in the step, based on the estimated primary prediction locus, the own vehicle estimated course PA1 of the own vehicle 50 and the own vehicle presence region EA1 are calculated, thereby obtaining the own vehicle solid body D51. Specifically, instead of the movement course of the own vehicle 50 estimated in step S102 based on the current state of the own vehicle 50, the vehicle information is calculated in step S104 based on the primary prediction locus of the own vehicle 50. Then, the process proceeds to step S105.

In step S105, it is determined if the own vehicle 50 will collide with the secondary target when the automatic braking is performed (i.e., the primary control is performed). Specifically, it is determined if there is a probability of collision between the own vehicle 50 and other object based on the primary prediction locus. When it is determined that the other object will probably collide with the own vehicle 50 (i.e., a positive determination is made), the other object (e.g., the object 52) is designated as the secondary target, and the process proceeds to step S106. By contrast, if none of the other objects detected by the object detector 10 has the probability of colliding with the own vehicle 50, a negative determination is made, and the process proceeds to step S110.

In step S106, it is determined if avoidance of the collision between the own vehicle 50 and the secondary target is possible. Specifically, based on the secondary prediction locus, it is determined if the collision between the own vehicle 50 and the secondary target can be avoided.

Here, the determination of whether the own vehicle collides with the secondary object is executed by substantially the same principle as employed to determine the collision with the primary object. That is, as described earlier, to determine if the collision with the primary object can be avoided, the primary prediction locus predicted based on the vehicle speed and the vehicle acceleration of the own vehicle or the like is utilized. By contrast, to determine if collision with the secondary object can be avoided, a secondary prediction locus predicted based on a vehicle speed and a vehicle acceleration of the own vehicle or the like obtained after the deceleration control is executed on the own vehicle for the primary object to avoid the collision therewith is utilized.

When it is determined in step S106 that the collision can be avoided, the process proceeds to step S107. By contrast, when it is determined that the collision cannot be avoided, the process proceeds to step S109.

In step S107, it is determined if the own vehicle 50 should be automatically braked to avoid the collision with the secondary target. Specifically, at the current position of the own vehicle 50, a TTC (a Time to Collision) indicating a collision time until the own vehicle 50 and the secondary target collide with each other is calculated. The TTC may be calculated by dividing a linear distance from the current position of the own vehicle 50 to the secondary target by the relative velocity of the secondary target relative to the own vehicle 50. Then, it is determined if the TTC calculated in this way is either a threshold TH1 or less. If the TTC is equal to the threshold TH1 or less (i.e., TTC TH1), the process proceeds to step S108. By contrast, If the TTC exceeds the threshold TH1 (i.e., TTC>TH1), the process proceeds to step S110.

Specifically, a driver has an option of either accelerating or steering the own vehicle other than braking the own vehicle to avoid the secondary object. Hence, if a time until the collision is shorter than a prescribed threshold (i.e., TTC TH1), and accordingly there is no room for the driver to choose one of accelerating and steering, the process proceeds to S108. By contrast, if a time until the collision is longer than the prescribed threshold (i.e., TTC>TH1), the process proceeds to S110, because there is no room for the driver to either accelerate or steer the own vehicle.

In step S108, besides being notified of a collision risk by an alarm, the own vehicle 50 is automatically braked to avoid the collision with the secondary target, thereby completing the process. According the operation performed in step S108, the own vehicle 50 is controlled to stop at a position facing a left side of the movement course of the secondary target shown in FIG. 2, so that the own vehicle 50 can be controlled not to collide with the primary target and the secondary target.

By contrast, in step S109, since the own vehicle 50 is notified of the collision risk by the alarm, but is not automatically braked, the process is terminated. According to the operation performed in step S109, in a situation difficult to avoid the collision of both the primary target and the secondary target with the own vehicle 50, by notifying the driver of that effect, an opportunity to avoid the collision by operation of the driver can be obtained.

Further, in step S110, it is determined if the own vehicle 50 should be automatically braked to avoid the collision with the primary target. In step S111, besides either the own vehicle 50 or its surrounding is notified of the collision risk by the alarm, the own vehicle 50 is automatically braked to avoid collision with the primary target.

Hence, according to the above-described embodiment, when the primary target (e.g., the object 51) is designated and the primary avoidance control is executed on the own vehicle 50 to avoid the interference with the primary target, the primary prediction locus along which the own vehicle 50 moves is estimated. Then, when the secondary target (e.g., the object 52) is designated based on the primary prediction locus and the secondary avoidance control is executed in the own vehicle 50 to avoid the interference with the secondary target, the secondary prediction locus along which the own vehicle 50 moves is estimated. Further, based on the secondary prediction locus, it is determined if the interference by the secondary target can be avoided by the secondary avoidance control. Based on such a determination result, the drive assistance control is performed in the own vehicle 50. Therefore, by using the primary and secondary prediction trajectories, the own vehicle 50 can be appropriately assisted not to be subjected to interferences in its driving from multiple objects around the own vehicle 50 which might otherwise probably collide with the own vehicle 50.

Specifically, with the drive assisting ECU 20, when it is determined that the interference by the secondary target with the own vehicle 50 is avoidable by executing the secondary avoidance control on the own vehicle 50, the secondary avoidance control is performed as the drive assistance control. With this, control capable of avoiding both the primary target and the secondary target can be performed.

Further, with the drive assisting ECU 20, when it is determined that the interference by the secondary target therewith is unavoidable by executing the secondary avoidance control in the own vehicle 50, the risk of interference thereof with the own vehicle 50 is notified as the drive assistance control without either braking or steering the own vehicle 50. Thus, an opportunity can be obtained for a driver either to reduce damage caused by the interference or to avoid the interference by operating the own vehicle 50.

Figure 9:
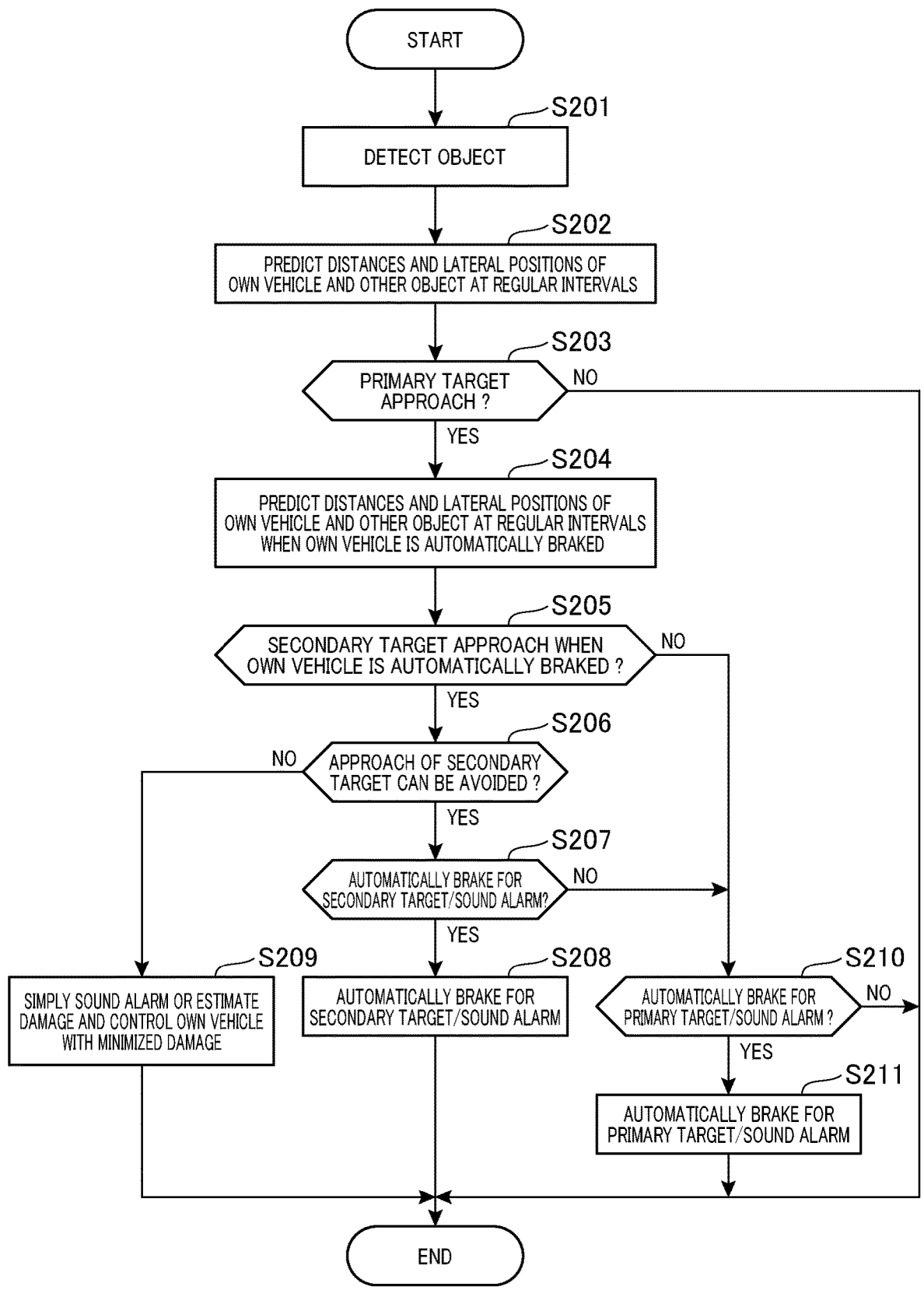
FIG. 9 is a flowchart illustrating a drive assistance control system of avoiding approach according to a second embodiment of the present disclosure.

A second embodiment is now described with reference to FIG. 9. As shown in FIG. 9, according to the second embodiment, instead of determining if the object can collide with the own vehicle based on the collision probability, it is determined based on an approach probability if an object will approach the own vehicle 50 within a prescribed distance. Specifically, differently from the determination of whether the collision probability exists as described with reference to FIG. 8, a determination of whether the approach probability exists is made in steps S203, S205 to S207 and S210 as illustrated in FIG. 9. However, since operation, such as detection of the object, prediction of a distance of each of the own and the other vehicles, etc., performed in applicable steps S201, S202 and S204 is the same as that performed in steps S101, S102 and S104 of the first embodiment, description thereof is herein below omitted.

Specifically, in the first embodiment, as shown in FIG. 7A, when the region OA overlapping the first determination region DA51 and the second determination region DA52 is present, it is determined that there is the intersection of the vehicle-dimensional D51 and the object-dimensional D52 thereby probably causing the collision therebetween. By contrast, in the second embodiment, presence of the overlapping region OA (i.e. the collision) is unnecessary in determining the approach probability. That is, for example, it can be determined that there exists the approach probability that the object approaches the own vehicle 50 when the shortest distance between the first determination region DA51 and the second determination region DA52 is less than a distant threshold L1 at the elapsed time T.

Further, a time to perform automatic braking in step S207 is advanced from that performed in step S107 of the first embodiment. Specifically, in step S207, as a threshold to be compared to a TTC indicating a collision time until the vehicle 50 and a secondary target collide with each other, instead of the threshold value TH1 of the first embodiment, a threshold TH2 (i.e., TH2>TH1) is used. Then, the TTC is calculated and it is determined if it is equivalent to the threshold TH2 or less. If the TTC is equal to the threshold TH2 or less (i.e., TTC≤TH2), the process proceeds to step S208. By contrast, if the TTC exceeds the threshold TH2 (i.e., TTC>TH2), the process proceeds to step S210.

Hence, according to the second embodiment, each of operations can be performed in the drive assisting ECU 20 based on the approach probability that the object approaches the own vehicle 50 within the prescribed distance. Therefore, an object is additionally examined as a possible obstacle to be avoided even if it does not collide but probably approaches the own vehicle 50. Hence, a safer drive assistance control can be more effectively performed by considering the safety than that performed based on the determination as to the collision probability.

Hence, with the above-described various embodiments, the below described advantages can obtained. First, the drive assisting ECU 20 is provided with the target setter 41, the prediction locus estimation unit 42 and the assisting controller 43 collectively acting as a drive assistance system. The drive assistance system controls the own vehicle 50 based on the interfering probability that running of the own vehicle 50 is interfered by the object located around the own vehicle 50 as detected by the object detector 10. Further, the target setter 41 functions as the primary target setter to designate the object (e.g., the object 51) as the primary target when the object is determined by the determiner 27 as the object probably causing interference with the own vehicle 50 based on the current movement locus of the own vehicle 50. The prediction locus estimator 42 estimates the prediction locus along which the own vehicle 50 moves when the primary avoidance control is executed in the own vehicle 50 to avoid the interference probably caused by the primary target. The target setter 41 further has a function as a secondary target setter to designate the object (e.g., the object 51) as the secondary target when the object is determined by the determiner 27 as the probable interference with the own vehicle 50 based on the estimated prediction locus. Further, the assisting controller 43 performs the drive assistance control in the own vehicle 50 based on the determination of whether the interference caused by the secondary target can be avoided by executing the secondary avoidance control in the own vehicle 50 to avoid the interference caused by the secondary target. With the drive assisting ECU 20, since the secondary target is designated based on the prediction locus and the drive assistance control is performed in the own vehicle 50 based on the determination of whether the interference can be avoided by executing the secondary avoidance control, driving assistance can be appropriately performed in the own vehicle 50 as a countermeasure against probable driving interference caused by the multiple objects around the own vehicle 50.

Further, in the drive assisting ECU 20, the assisting controller 43 can perform the secondary avoidance control as the drive assistance control when the interference by the secondary target with the own vehicle 50 is determined to be avoidable by executing the secondary avoidance control to control the own vehicle 50. Thus, control capable of avoiding the interference by both the primary target and the secondary target can be performed.

Further, when the interference by the secondary target with the own vehicle 50 is determined to be unavoidable by executing the secondary avoidance control controlling the own vehicle 50, the assisting controller 43 can estimate damage probably caused in the own vehicle 50 per control method implemented in such a situation. The assisting controller 43 can then preferably control the own vehicle 50 using the control method capable of minimizing the estimated damage as the drive assistance control.

Further, when the interference by the secondary target with the own vehicle 50 is determined to be unavoidable by executing the secondary avoidance control to control the own vehicle 50, the assisting controller 43 can notify the own vehicle 50 of the effect that there is a probability of interference with the own vehicle 50. Hence, an opportunity of either avoiding the interference or reducing the damage caused by the interference is left for the driver to perform preferable operation of the own vehicle 50.

Further, for each of the processes executed by the drive assisting ECU 20, the probability of interference can be determined based on the probability of collision between the object and the own vehicle 50. That is, as the interfering probability, the collision probability can be used.

Further, for each of the processes executed by the drive assisting ECU 20, the probability of interference can be determined based on the approach probability of the object approaching the own vehicle 50 within the prescribed distance. That is, the approach probability can be determined in various situations including when the object does collide but approaches the own vehicle 50. Hence, as compared with the situation in which the determination is made for each of the processes based on the collision probability, more secure drive assistance control can be achieved.

Further, according to the drive assisting ECU 20, the own vehicle solid body D51 indicating the transition of the own vehicle presence region EA1 and the object solid body D52 indicating the transition of the object presence region EA2 are calculated on the three-dimensional coordinate system defined by including the elapsed time from the current time. Then, based on either presence or absence of the interaction of the vehicle solid body D51 and the object solid body D52, presence or absence of the probability of collision between the object and the own vehicle 50 is determined. Therefore, since the determination of collision is made based on the own vehicle solid body D51 extended in the three-dimensional coordinate system, a region of the intersection is wider than when moving loci intersect with each there. As a result, determination of the possible collision can be performed based on various situations including a positional relation between the object and the own vehicle 50 and a moving state of the object or the like, thereby properly determining either presence or absence of probability of the collision of the object with the own vehicle 50. Furthermore, since presence or absence of probability of the collision is determined based on presence or absence of the intersection of the vehicle solid body D51 and the object solid body D52 on the three-dimensional coordinate system, presence or absence of probability of the collision can be properly determined based on the elapsed time.

Further, heretofore, various methods of calculating probability of the collision of the surrounding object with the own vehicle 50 and probability of the approaching thereof are described such that the own vehicle 50 solid body and the object solid body indicating the transitions of the presence regions of the own vehicle 50 and the object are respectively calculated and either presence or absence of their overlap is determined. However, the present disclosure is not limited to the above-described determining methods. For example, a positive determination that probability the collision is present when movement courses of the own vehicle 50 and the object are respectively estimated and it is determined that the object reaches the movement course of the own vehicle 50. Further, a positive determination may be made when the movement courses of the own vehicle 50 and the object are respectively estimated and it is determined that the object probably approaches the movement course of the own vehicle 50 within a distance less than a prescribed threshold.

Further, in the above-described various embodiments, the object detectors 10 are composed of the millimeter wave radar sensor 11 and the radar ECU 12. However, the present disclosure is not limited to those devices. For example, each of the object detectors 10 can be composed of either an image sensor for detecting a position of an object based on an imaged image or a laser sensor for detecting a position of the object by using a laser beam. In addition, when the own vehicle 50 is enabled to perform vehicle-town vehicle communication between the own vehicle 50 and other vehicles traveling around the own vehicle 50, the own vehicle 50 can obtain a position of an object detected by an object detector mounted on the other vehicles by performing the vehicle-town vehicle communication.

Further, the drive assisting ECU 20 can calculate the own vehicle estimated course PA1 by using an acceleration of the own vehicle 50 in addition to the yaw rate $\Psi$ and the velocity of the own vehicle 50.

Numerous additional modifications and variations of the present disclosure are possible in light of the above teachings. It is therefore to be understood that within the scope of the appended claims, the present disclosure may be executed otherwise than as specifically described herein. For example, the drive assistance system is not limited to the above-described various embodiments and may be altered as appropriate. Further, the vehicle with the drive assistance system is not limited to the above-described various embodiments and may be altered as appropriate.

What is claimed is:

1. A drive assistance system for controlling an own vehicle based on a probability that an object located around the own vehicle detected by an object detector will interfere with running of the own vehicle, the drive assistance system comprising:
    a primary target setter to designate an object determined, based on a current movement locus of the own vehicle, to be a primary target that is likely to interfere with the own vehicle;
    the current movement locus being calculated based on a speed of the own vehicle and a yaw rate of the own vehicle;
    a prediction locus estimation unit to estimate a prediction locus along which the own vehicle moves when primary avoidance control is executed on the own vehicle, the primary avoidance control being executed for the own vehicle to avoid the interference by the primary target by changing the speed of the own vehicle;
    the prediction locus estimation unit estimating the prediction locus based on the speed of the own vehicle as changed to avoid the interference by the primary target;
    a secondary target setter to designate another object determined, based on the prediction locus, as a secondary target that is likely to interfere with the own vehicle moving along the prediction locus while avoiding the interference by the primary target; and
    a drive assistance controller to execute drive assistance control on the own vehicle running along the current movement locus based on a determination of whether the interference by the secondary target can be avoided by executing a secondary avoidance control on the own vehicle, the secondary avoidance control being executed for the own vehicle to avoid the interference by the secondary target by further changing the speed of the own vehicle.

2. The drive assistance system as claimed in claim 1, wherein the drive assistance controller performs the secondary avoidance control as the drive assistance control in addition to the primary avoidance control when it is determined that the interference by the secondary target can be avoided by executing the secondary avoidance control.

3. The drive assistance system as claimed in claim 1, wherein the drive assistance controller estimates damage to the own vehicle per method of controlling the own vehicle when the interference by the secondary target is determined to be unavoidable by executing the secondary avoidance control,
- wherein the drive assistance controller controls the own vehicle using one of prescribed methods greatly minimizing the damage to the own vehicle more than the other one of prescribed methods based on the estimation,
- the prescribed methods including methods of avoiding interferences by the primary target and the secondary target, respectively.

4. The drive assistance system as claimed in claim 1, wherein the drive assistance controller notifies the own vehicle of the effect that the own vehicle is likely interfered with by the secondary target without either automatically braking or steering the own vehicle and allows a driver to manually operate when the interference by the secondary target is determined to be unavoidable by executing secondary avoidance control.

5. The drive assistance system as claimed in claim 1, wherein the probability of the interference is determined based on a probability that the object and the own vehicle collide with each other.

6. The drive assistance system as claimed in claim 1, wherein the probability of the interference is determined based on a probability that the object approaches the own vehicle within a prescribed distance less than a given threshold.

7. A vehicle driven by a driver, the vehicle comprising the drive assistance system as claimed in claim 1.

* * * * *